Feb. 8, 1944.  V. E. BABCOCK  2,341,073
BACK LASH PREVENTER FOR FISHING REELS
Filed Oct. 18, 1941  2 Sheets-Sheet 1

Inventor
Verner E. Babcock

By Clarence A. O'Brien

Attorney

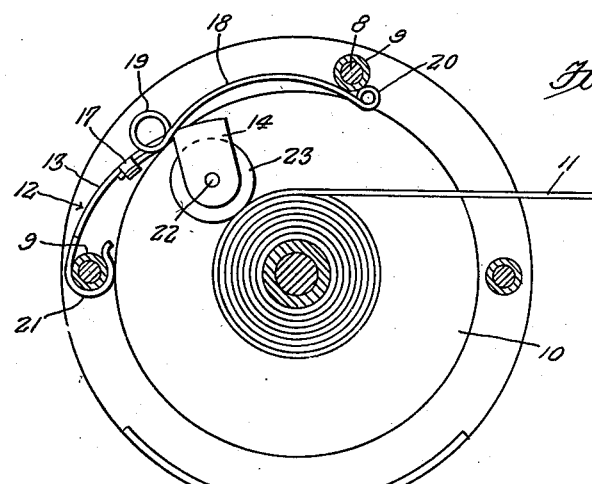
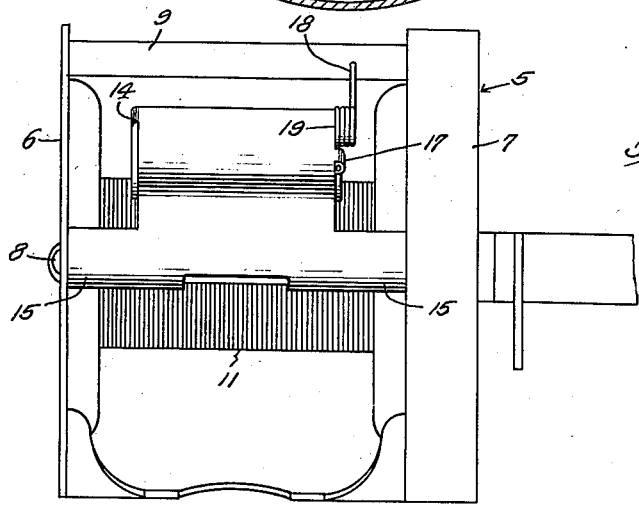
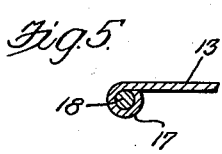

Patented Feb. 8, 1944

2,341,073

UNITED STATES PATENT OFFICE 2,341,073

BACKLASH PREVENTER FOR FISHING REELS

Verner E. Babcock, Port Clinton, Ohio

Application October 18, 1941, Serial No. 415,620

1 Claim. (Cl. 242—84.5)

This invention relates to new and useful improvements in fishing reels, the same being an improvement on my Patent No. 2,257,521, issued September 30, 1941.

The principal object of the present invention is to provide a backlash preventer for fishing reels which can be readily controlled by the fisherman and which is of very low expense to install.

Another important object of the invention is to provide a backlash preventer for fishing reels which can be installed on conventional makes of reels.

These and other objects and advantages of the invention will become apparent to the reader of the following description.

In the drawings:

Figure 2 is a rear elevational view of a reel with the backlash preventer installed.

Figure 3 is a sectional view taken substantially on line 3—3 of Figure 1.

Figure 5 is a fragmentary detailed sectional view taken substantially on line 5—5 of Figure 1.

Figure 1:
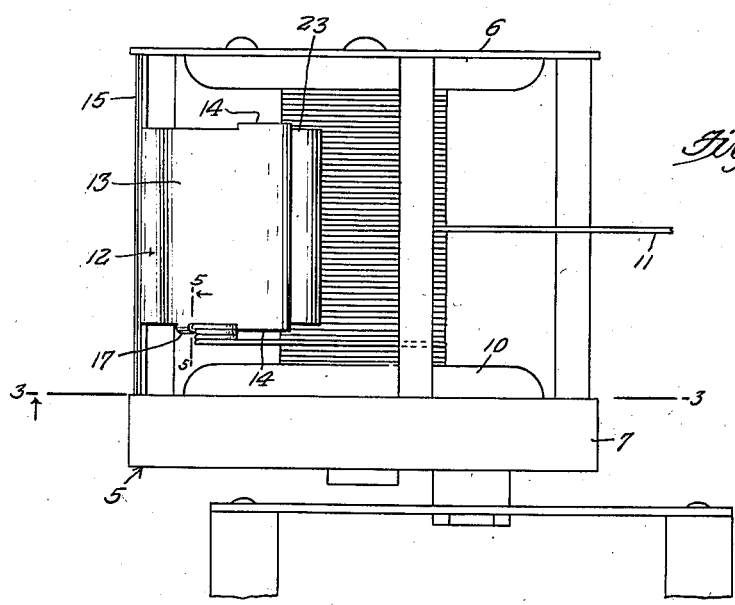
Figure 1 is a top plan view of a conventional reel equipped with the attachment.

Referring to the drawings wherein like numerals designate like parts, it can be seen that, in Figure 1, numeral 5 generally refers to a conventional fishing reel which briefly described consists of a side wall 6, a mechanism box 7, these being connected by tie bolts 8 on which are spacer sleeves 9. Interposed between the wall 6 and box 7 is a spool 10 on which a fishing line 11 is wound.

Figure 4:
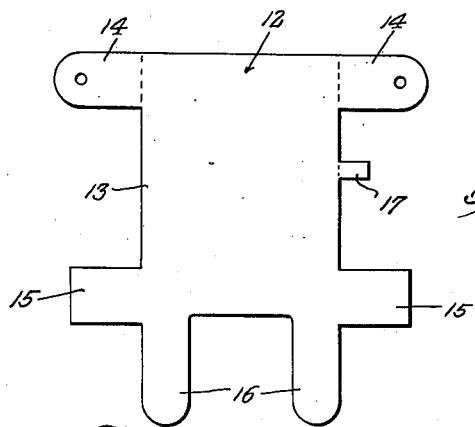
Figure 4 is a plan view of the blank from which the backlash preventer is constructed.
Figure 6:
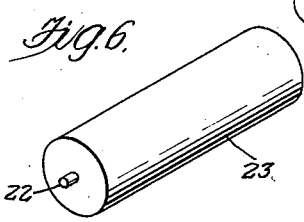
Figure 6 is a perspective view of the roll.

The present invention is generally referred to by numeral 12 and the major portion of this is constructed from a plate stamped to the form shown in Figure 4. The plate is denoted by numeral 13 and is of general rectangular shape having laterally disposed ears 14, 14 at one end and laterally disposed shoulder members 15, 15 at its opposite end. At its latter end the plate 13 is provided with finger-like extensions 16, 16.

At the intermediate portion of the plate 13 is a laterally disposed lug 17.

For use in conjunction with the plate 13 is an elongated wire spring 18 looped at an intermediate point, as at 19, to increase the spring action thereof. One end of the spring 18 is held or anchored in place by clinching the lug 17 against the same, as suggested in Figure 3. The other end of the spring 18 is formed with an eye or other enlargement 20 and this portion of the spring 18 is sprung under the uppermost spacer 9, as shown in Figure 3.

The plate 13 is preferably of some suitable spring material and the extensions 16, 16 are bent to form spring clips 21 which are snapped over the rearmost spacer 9 in the manner as suggested in Figure 3, while the shoulders 15 are preferably curved transversely to conform with the curvature of the last-mentioned spacer 9.

The ears 14, 14 are bent downwardly, as shown in Figure 3, and form with openings to receive pintles 22 which extend axially from a roll 23, thus supporting the roll 23.

With the parts thus constructed and mounted, the spring 18 serves to force the roll 23 against the fishing line wound on the spool 10 and prevents backlash action of the line, as when casting.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

An attachment for fishing reels comprising a plate having a spring clip formation at one end thereof for embracing one of several usual reel tie members, a roller mounted at the other end of the plate for engaging wound fishing line and a spring member extending from the roller end of the plate and provided with an abutment for engaging under another usual fishing reel tie member.

VERNER E. BABCOCK.